June 29, 1943.    M. E. BURNS ET AL    2,322,919
CRAWLER TRACTOR
Filed Feb. 24, 1941    4 Sheets-Sheet 1

Inventors:
Murray E. Burns
George M. Bonnell
By McCaleb & Wendt
Attys.

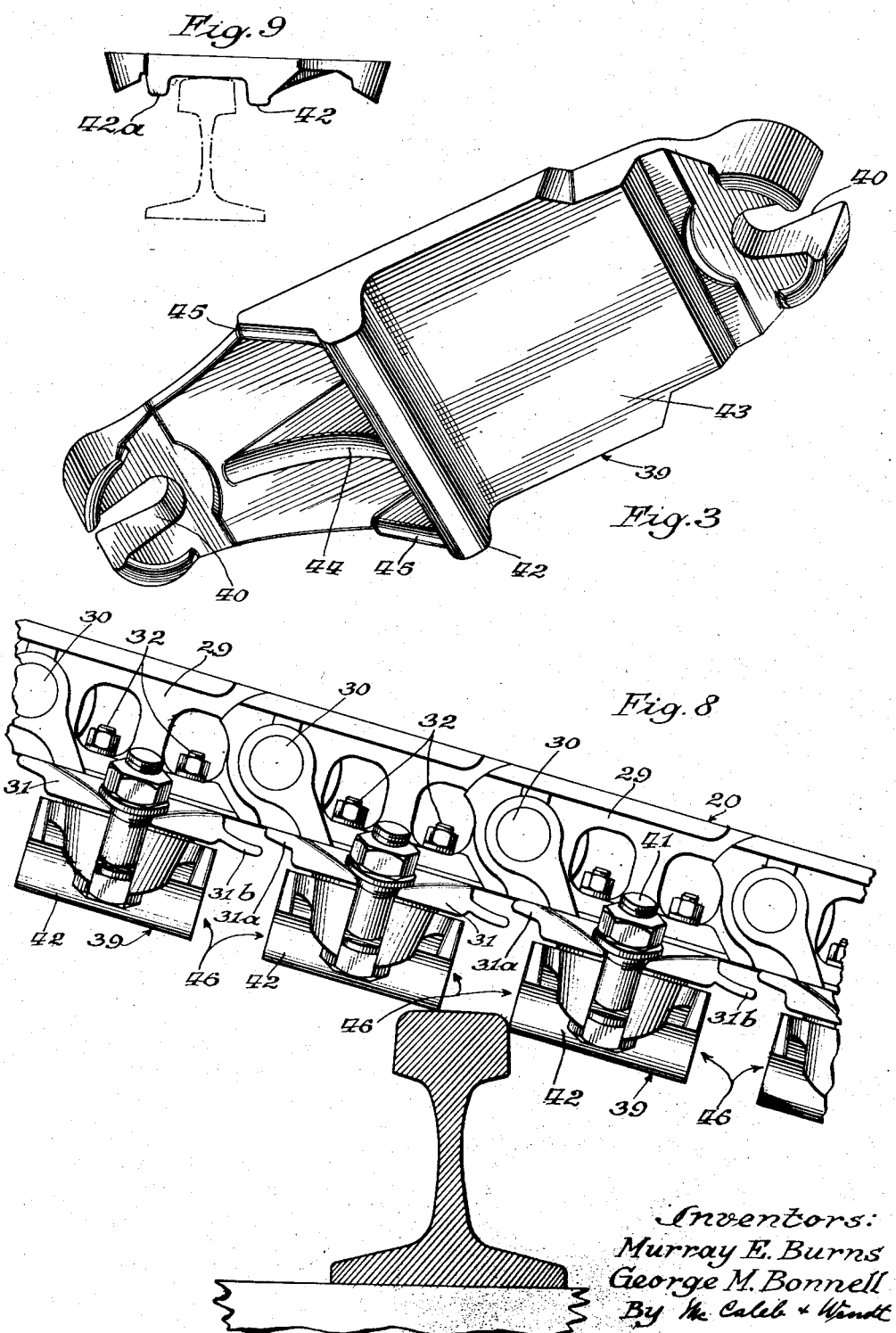

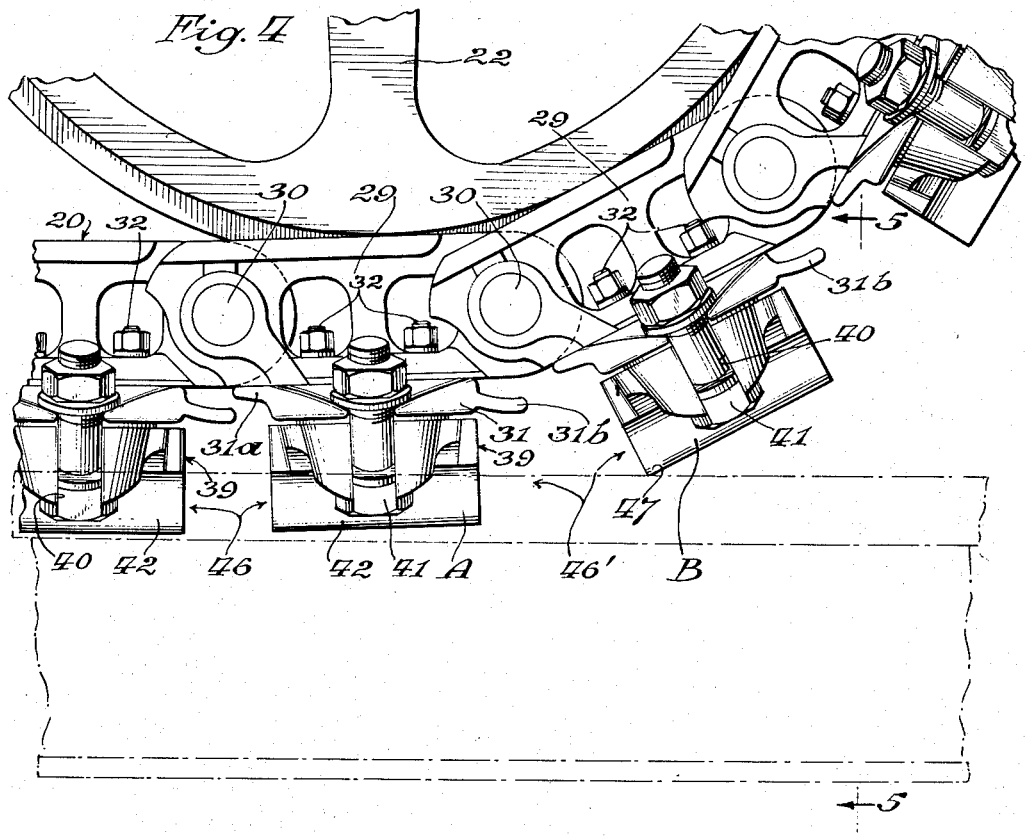
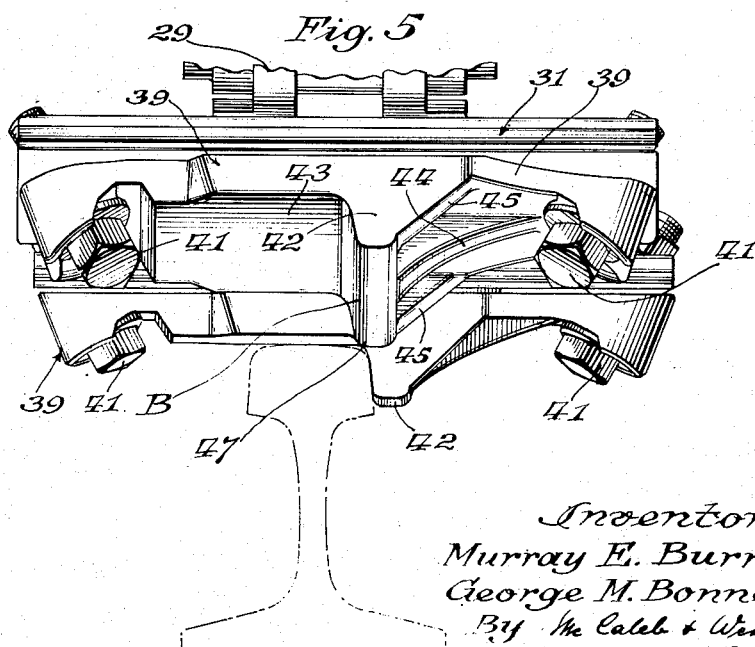

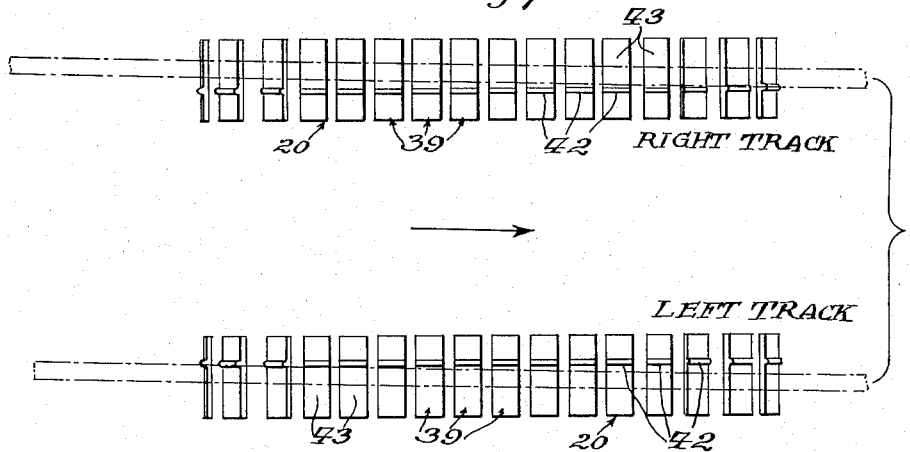
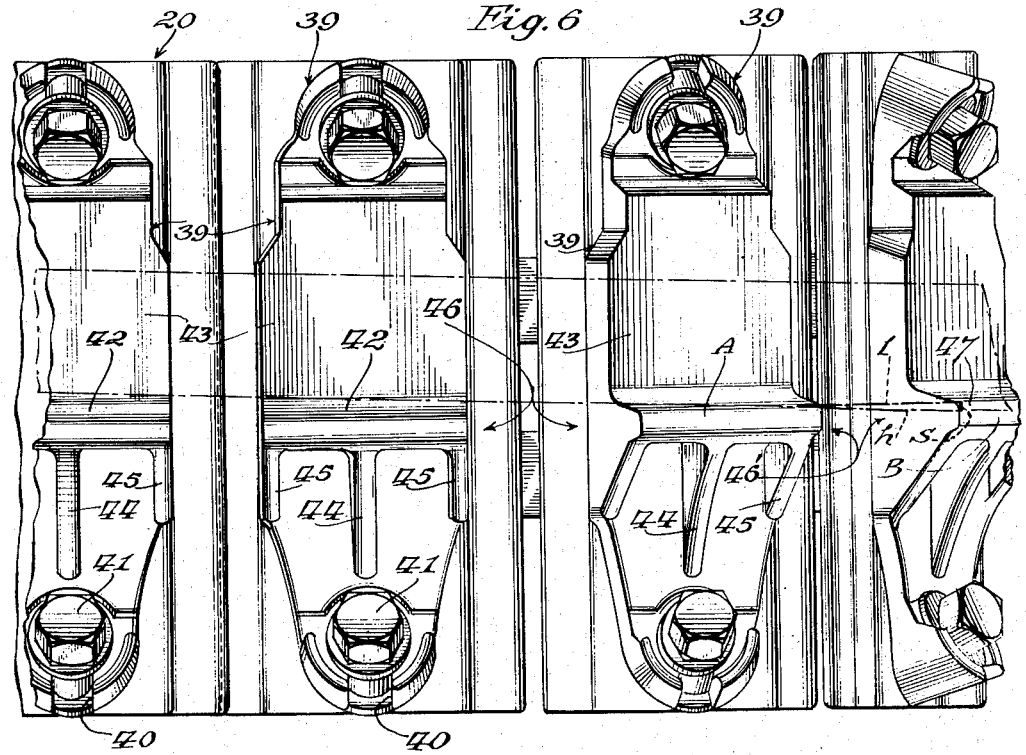

Patented June 29, 1943

2,322,919

UNITED STATES PATENT OFFICE 2,322,919

CRAWLER TRACTOR

Murray E. Burns and George M. Bonnell,
Boise, Idaho

Application February 24, 1941, Serial No. 380,256

24 Claims. (Cl. 105—215)

Our invention relates to track-type (i. e., crawler-type) tractors, and is concerned with adapting their tracks for running on the rails of railways. Our invention is especially concerned with the problem of readily maneuvering such a tractor off the rails. In construction and maintenance work on railways, it is of great advantage to be able to operate track-type tractors optionally on the rails. Many operations of grading and ballast distribution can most advantageously be accomplished by running the tractor on the rails. Other work must inherently be done by the tractor working off the rails and often at some distance from them. One resultant advantage is that the cost of railway rolling stock equipped with spreaders, graders and the like is obviated. Another advantage is that if—as should be the case—the tractor may readily be removed from the rails, there is less mutual interference between regular train traffic and the on-rails work of the tractor than would be the case with a grader mounted on railway rolling stock which would have to be sent back or ahead, maybe for several miles to a siding. If such interference is to be minimized, it is very desirable— if not imperative—that the driver of the tractor, when working on rails, be able to maneuver the tractor off the rails quickly, without assistance (as by a workman placing derailing blocks ahead of the tractor), and at any selected place (there may be only one place where the shoulder is wide enough to park the tractor while the train passes). Failure to remove the tractor quickly, as by the driver having to wait for somebody to come and assist him, or failure to run the tractor off the track at a particular place, may cause delay of an oncoming fast train or, still worse, a collision with damage to the tractor and probable derailment of the train on account of the mass of the tractor.

The usual practice in adapting track-type tractors to run on rails has been to provide their shoes with depending lugs extending across the face of the shoes in a direction parallel with the rails, these lugs being roughly comparable with the flanges on car wheels. This comparison, however, is subject to this significant distinction: In car wheels the rims are somewhat conically conformed to taper away from the flanges. Because the left and right wheels rotate together, being fixed to the same axle, if the flange of the left wheel comes closer to its rail than the flange of the right wheel to its rail, the left wheel, having a greater circumference of contact, tends to move ahead until the gaps between the flanges and their rails are equalized. Thus the flanges serve more or less as safety guides than as routine means for keeping the wheels on the tracks. On the other hand, track-type tractors are steered by braking on the differential drives between their tracks. This requires a very frequent steering operation by the driver to keep them traveling relatively straight, and they tend to swerve considerably as compared with the normal gap of about half an inch between flange and rail face. Also, because the tracks are not locked to move in synchronism, it is impossible to use the previously-mentioned self-centering expedient which is employed in railway rolling stock. As a result, the full burden of keeping the tractor on the rails falls on the depending flange lugs provided on the shoes. Their structure and function cannot be slighted because they must be so actively relied upon for keeping the tractor on the rails.

Our solution to this important problem of permitting the tractor quickly to be maneuvered off the track by the driver without outside assistance and wherever he wills is realized by a structurally simple design and arrangement of the depending flange lugs of the track shoes.

It must be appreciated that the design of these depending flange lugs is further limited by a number of factors: Much like the flanges of car wheels, the depending flange lugs are limited in depth and width by the limited clearances along guard rails, frogs, crossings, etc. When the tractor is running off the rails—and this is often on crushed rock—most of the load and friction come on the bottom faces of the flange lugs which must extend considerably lower than the other parts of the shoes, and therefore the wear surfaces at the bottoms of the lugs should not be too restricted. Also, the tractor will often have to pass over the rails crosswise in moving from one side of the track to the other, and also the tracks will have to pass on to or over rails oblique-wise in maneuvering the tractor on to the rails; the lugs should not be so arranged that they are apt to grip the rails and tear them loose or stall the tractor or damage the shoes at such times.

Still another aspect of the problem is that if the shoes and their depending lugs are to be so constructed that they will enable the driver to maneuver the tractor off the rails at will, this desirable function should not be at the substantial expense of the tractor's maneuvering itself off the rails when the driver does not want it to, even along guard rails, frogs and crossings.

By our invention the depending lug flanges on the track shoes are so arranged that a definite steering effort to the right or left, as the case may be, at the will of the operator, takes advantage of the slight angular relationship thereby produced between the two lines of depending flange lugs and the inner faces of the rail heads as permitted by the normal clearance spaces between the flanges and rail heads, to enable the leading flange lug at the region of lateral crowding to get a slight overlapping bite upon the upper surface of the rail head, with the lateral thrust or crowding due to the turning effort maintaining that bite until the flange lug in question has elevated the neighboring shoes to permit their lugs also to ride on to the top of the rail, whereupon the tractor may be run off the rails. This climbing-off action is made possible by properly proportioned gaps between adjacent depending flange lugs. The nature of the action will, of course, be made clearer in the description which follows.

Our invention provides a very practicable but simple and inexpensive solution to the problem of quickly maneuvering a track-type tractor off the rails at any desired place at the will of the operator and in the absence of assistance from without.

Crawler tractors thus equipped to run on rails may also be employed for moving railway cars short distances in construction work and in spotting or switching cars in railway yards. The tractor can run off the rails to get quickly to the desired cars. For this purpose, the tractor may be provided with front and rear pusher bumpers or with couplers which co-operate with standard car couplers.

Even when the work of a tractor is to be done off rails on railway construction work, it is often of advantage to be able to run the tractor on rails as the quickest route betwen locations, as in traveling on the rails across a bridge, trestle or fill across a river or ravine where a wagon road, if any, would be long, slow or difficult.

In all such uses, ready removal from the rails is of great importance.

The foregoing, together with further objects, features and advantages of my invention, are set forth in the following description of a specific embodiment thereof illustrated in the accompanying drawings, wherein:

Fig. 3 is an upwardly-viewed perspective illustration of one of the auxiliary track shoes with its depending flange lug;

Fig. 4 is a fragmentary enlarged detail of Fig. 1, showing the leading shoes of the track with one of them starting to climb up on to the top of the rail preparatory to derailment;

Fig. 5 is a front view of the parts of Fig. 4, and may be considered as taken on the line 5—5 of Fig. 4;

Fig. 6 is a bottom view of the parts shown in Figs. 4 and 5;

Fig. 7 is a schematic bottom view of the two tracks of the tractor in slight angular relationship to the two rails preparatory to the climbing off action;

Fig. 8 is a side elevation of a bottom reach of the track showing its relation to a rail when the tractor passes crosswise over the rail; and Fig. 9 is a front elevation of a modified form of auxiliary shoe.

Figure 1:
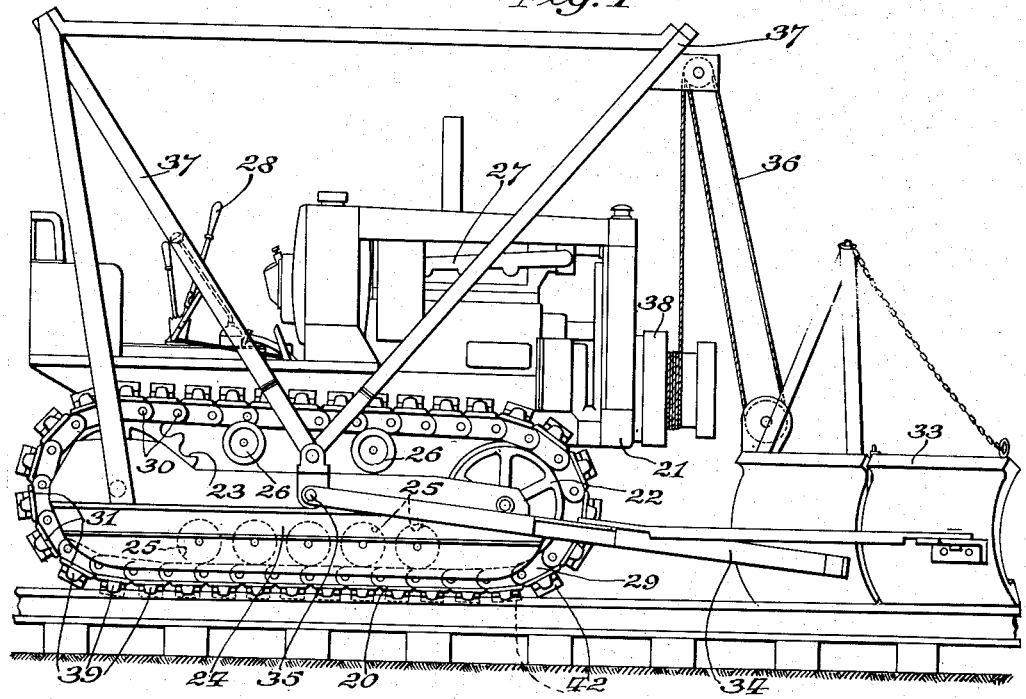
Fig. 1 is a side elevation of a crawler-type tractor, the track shoes of which conform to our invention.
Figure 2:
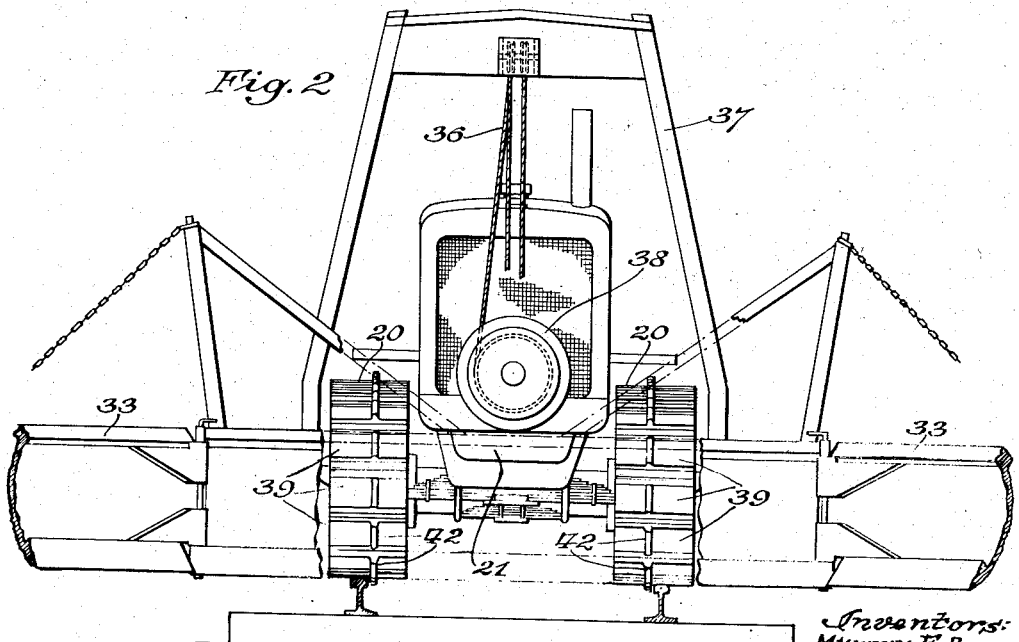
Fig. 2 is a front elevation of the tractor with central and outward portions of the grader attachment it carries being broken away.

Referring to Figs. 1 and 2, the crawler-type tractor illustrated has right and left endless tracks 20 at the sides of the chassis 21. Each track is trained about a front wheel 22 and a rear drive sprocket 23 which are journaled in a track frame 24, which in turn is pivotally mounted on the chassis. The lower reach of each track is held straight by a series of lower rollers 25 journaled in the track frame, and the upper reach is supported by idling rollers 26. The motor 27 drives the sprockets 23 through a different transmission, and the tractor is steered by steering levers 28 braking on the transmission.

Each track 20 is itself composed of a series of pairs of laterally spaced link-like rail sections 29 assembled by pintles 30. A relatively smooth-faced primary shoe 31 extends across each pair of rail sections 29 and is bolted thereto by bolts 32 (Fig. 4).

The tractor and track construction as thus far described is of the usual and standard design, that illustrated being, specifically, the construction and design commercially known under the name of Caterpillar tractor.

For grading work, especially when the tractor is running on the rails of a railway, a grader attachment 33 may be employed at the forward end of a boom 34 pivoted at 35 on the track frames and supported for vertical adjustment by a cable 36 passing over a pulley on a super-structure 37 and wound upon and unwound from a power winch 38 at the front of the chassis.

In equipping the tracks with the depending flange lugs adapting it to run on the rails, we prefer to attach the lugs as parts of auxiliary shoes rather than making the lugs integral parts of the primary shoes or attaching the lugs per se directly to the primary shoes, although we contemplate that these alternative arrangements might be employed.

One of these auxiliary shoes 39 is shown in Fig. 3 as it would be viewed in perspective from beneath. In length, as will be seen from Fig. 5, the auxiliary shoe is substantially coextensive with the primary shoe. At each end it carries an endwise opening slot 40 for the reception of bolts 41, which extend through somewhat similar slots in the ends of the primary shoe, whereby the auxiliary shoe is attached to the primary shoe. The ends of the auxiliary shoes, at the slots 40, are toed downwardly somewhat to facilitate an oblique position for the attaching bolts 41 and to raise the heads of the bolts, if desired, so that they may have something of a grouser action.

Intermediate its slotted ends, the auxiliary shoe 39 is plate-like with a flat upper surface to lie flatwise against the flat bottom surface of the primary shoe. A flange lug 42 extends transversely across and depends from the plate-like body of the auxiliary shoe, and, as shown in Figs. 3 and 5, is located somewhat inwardly (that is, inwardly toward the longitudinal vertical center plane of the tractor) from the true mid point of the auxiliary shoe. For some distance outwardly from the flange lug 42, the plate portion is thickened, as at 43, to provide a strengthened wear surface for flatwise engagement of the top surface of the rail head, as is best illustrated in Fig. 5. The cross-section of the depending flange lug 42 is generally similar in contour and dimension to the standard flange on a car wheel, so that it can take advantage of, without going beyond, the clearance spaces provided in railroad trackage for the wheel flanges.

At its inner side, the flange lug 42 is reinforced by medial and flanking ribs 44 and 45 extending obliquely between the side of the lug and the plate-like base portion of the auxiliary shoe. By the ribs the flange lugs may better bear the lateral thrusts of the tractor against the rails.

As best shown in Fig. 8, the length of the flange lugs—and especially the length of their lower edges—is considerably less than the pitch of the track links—that is, the distance between their pintles 30. This leaves a gap 46 between the ends of adjacent flange lugs 42. For convenience, the leading and trailing edges of the thickened plate-like portion 43 of the auxiliary shoes may coincide with the length of the flange lugs 42. This over-all dimension of the shoe may thus coincide with that of the bottom face of the associated primary shoe, exclusive of the overlapping flanges 31a, 31b thereof.

The shorter the effective length of the flange lugs 42, and therefore the greater the gaps 46, the more effective is the climbing out action presently to be described. But there are factors which, at least in the form here shown, tend to limit the length of the gap (that is, the length along the reach of track). One of those limiting factors, as best demonstrated in Fig. 8, is that the gap be substantially less than the width of the rail head. Otherwise when the tractor passes over a rail crosswise thereof, the head would be locked in the gap with the result that shoes would be broken or distorted or the rail would be pulled loose. Another limiting factor is that the vertical face of the flange lug 42, which contacts the lateral face of the rail, should be of sufficient area to give a sizable wear surface since, as pointed out in the introduction, this face of the flange does the routine work of holding the track on the rail. Still another limiting factor is that the bottom surface of the flange lug should present enough area to withstand wear when the tractor is not running on rails.

In the specific embodiment here illustrated, the pitch of the track lengths—the distance between pintles—can be considered as 6¾ inches and the lengths of the flange lugs 4¾ inches, leaving a normal gap of 2 inches. And the rail head can be considered as 3 inches wide, with the gap 1 inch short of a size sufficient to receive the rail head when the track passes over it crosswise. We find these dimensions work out satisfactorily in practice and enable the tractor to cross over lighter rails where the head width is less than 3 inches but still substantially more than 2 inches.

The flange lugs 42 are so positioned on the auxiliary shoes, the auxiliary shoes so positioned on the tracks, and the tracks so spaced, that the distance between the outer lateral faces of the flange lugs is substantially the same as the distance between the outer faces of the wheel flanges on railway rolling stock. This is about 1 inch less than the gauge dimension; that is, the distance between the inside faces of the rail heads on standard railway track. Thus, when the tractor is centered on the rails, there is a half-inch clearance at each side between the flange lugs and the rail heads. The bottom reach of track on the crawler tractor being about as long as the distance between axles in a four-wheel car truck, the maintenance of this more or less standard railway clearance for the flange lugs on the tractor tracks will prove adequate to keep the tractor guided straight by the rails without much side sway and yet without danger of binding.

This lateral play or clearance as between the flange lugs and the gauge of the rails is utilized in the peculiar action of our gapped flange lugs in enabling the tractor to climb off the rails, as will now be described.

The operation of derailing the tractor is as follows: At the place and at the time the operator wants to run the tractor off from the rails, to the right for example, he steers the tractor to the right. This is done, in a crawler tractor of this type, by driving the left track faster than the right track. The turning effect is, of course, limited by the rather small clearance between the rail heads and the flange lugs. But yet there is thereby a definite turning of the two tracks in reference to the rails, as is indicated in the schematic bottom view of Fig. 7, except that the small angle has been somewhat exaggerated. This, as shown in Fig. 7, results in the leading flange lugs of the bottom reach of the right-hand track and the trailing lugs of the bottom reach of the left-hand track being crowded transversely against the rail heads.

The angle thus created between the inner face of the rail head and the adjacent line of flange lugs is a very small angle—an angle in the order of 1:70. But, small though that angle may be, it does permit the flange lug B (Figs. 4, 5 and 6), which has not yet come down into vertically overlapping relation with the rail head, to overlap by a slight amount the top edge of the rail head, as shown at 47. This slight lateral overlap may be considered as the short leg $s$ of a triangle, the hypotenuse $h$ of which lies along the inner vertical face of the rail and the long leg $l$ of which bridges the gap 46' (Fig. 4) between the end of the flange lug B and the near end of the flange lug A on the first shoe to the rear which, being the foremost lug of the bottom reach, is the one which contacts the rail face.

It will be apparent from the triangle $s$, $h$, $l$ that the greater the gap between lugs, the greater will be the overlap $s$ at 47, and therefore the better the climbing off action. As the tractor continues to move forwardly from the position of Figs. 4, 5 and 6, the shoe carrying the lug B tends to move down. But as the slight overlap at 47 holds the rearward lower corner of the lug up at the top of the rail, the shoe cannot move down, and instead the track is elevated. By the time the shoe carrying the lug B has moved to a position under the axis of the wheel 22 (that is, by the time the lug B has moved to occupy the longitudinal position of lug A in Fig. 4), the area of overlap will be greatly enlarged. In length it will be enlarged to the length of the lug B. In width it will range from the distance $s$ at the rearward end of the lug B to a considerable greater width at the forward end. Once the lug B has thus gained a purchase on the upper face of the rail head, and has elevated the front end of that track to the height of the rail head, the additional shoes swinging down about the wheel 22 will ride quite easily upon the top of the rail head, and they will be shifted farther toward the outside of the rail. Thus, within a short distance of travel after the initiation of the climbing out action by the lug B, the tractor will turn quite sharply off the rails. When turning to the right, for instance, as above described, it is only the leading shoes on the right-hand track which do the climbing out; the lugs on the left-hand track do not have to climb up on to the top of the left rail.

It will be seen that the necessary function which the gaps 46 perform is to enable the downcoming lug B laterally to overhang by at least a small distance the top of the rail head, by virtue of the slight angular relationship produced by the turning effort of the tractor within its confines between the rails. Were there not a considerable gap, the next lug A to the rear would hold the lateral face of the lug B in the plane of the face of the rail head, and the lug B could not get any overhanging purchase on the top of the rail.

It might be mentioned at this point that the effective gap in this climbing out action is somewhat greater than the normal gap 46 between lugs as measured along the bottom reach. From Fig. 4 it will be seen that the gap 46' between lugs A and B, measured at the moment the climbing out action is initiated, is enlarged by the spreading apart of the shoes as they start to train about the wheel 22.

But the presence of the gaps 46, important as they are, is not in itself enough to effect derailing. There must also be the turning effort. This is fortunate, for otherwise the normal swaying of the tractor as it runs along the rail might bring the tractor into the angular position of Fig. 7 and thereby cause an unintended derailment.

The lateral overhang at 47 in the position of Figs. 4, 5 and 6, when the climbing out action is initiated, is a very slight overhang and also the overlapping surfaces of the rail head and the lug are more or less rounded or soon will become rounded by wear. The slightness of the lateral overhang and the roundness of the overhanging parts would cause the lug to be cammed down into normal position beside the rail head, were it not for the maintained very forceful lateral thrust of the steering or turning effort of the tractor. That thrust holds the slight overlap gained, despite the camming tendencies of the somewhat rounded engaging surfaces, and the continuation of that lateral thrust upon the lug B tends continually to increase its overlap.

It will thus be seen that the successful derailment action can be obtained only by the simultaneous presence of these three factors: The gap 46, the angular or turned relationship of Fig. 7, and the lateral thrust or crowd. These latter two factors are, of course, the joint results of the steering or turning effort of the tractor. The reason why the tractor will keep its course on the rail without unintentional derailment and without derailment by the operator is that while the first and second factors may be present from time to time, there is not a coincidence therewith of the third factor—the lateral thrust—unless the driver intentionally steers the tractor to produce it as would be true only when he intended to derail the tractor.

A situation which might tend toward an exception to the foregoing statement is where there is a definitely one-sided drag on the tractor. This might be encountered, for example, where there was a pile of ballast material which had been dumped on the right side of the railway track and it was engaged only by the right wing of the grader 33. Such a situation may be met in two ways: First, the driver can anticipate such a condition, because he can foresee it and he can manipulate the steering levers of the tractor to offset it, especially since the tractor could not be traveling very fast at such a time. Second, the lugs may be designed of such a length as to leave effective gaps 46, which do not give so much overlap that derailment could be readily effected in such situations and yet provide adequate overlap for the climbing out action under the extreme lateral thrust which can be produced at the will of the operator by steering manipulation of the tractor.

We have put the emphasis on the derailing of the tractor, because this is the great problem. Maneuvering the tractor on to the rails presents no difficulty so long as the lugs or other parts of the shoes are not so designed as to permit the rail heads to become locked between the auxiliary shoes when the tracks pass over the rails crosswise or obliquely in the course of getting into position on the rails.

The gaps 46, as shown in Fig. 8, are preferably made short enough so that they will not receive the rail heads not only along the flat bottom reach of track but also so that when the gaps are enlarged as at 46' in Fig. 4, where the shoes are trained around the wheel, they will not receive the rail head.

The action and advantages of our improved tracks, as regards climbing on to the rails, climbing off the rails, and crossing over the rails, are equally present whether the tractor is driven forwardly or rearwardly at the time.

By equipping the tracks with the gap-spaced lugs by means of auxiliary shoes bolted to the primary shoes, the flexibility of use of the tractor is greatly enhanced. Any stock crawler tractor with standard flat primary shoes can quickly be converted, at relatively small expense, to operation optionally on rails or off rails. When tractors equipped with our flange lugs are operated off the rails, the attaching bolts 41, the depending bosses surrounding their slots, the flange lugs 42, and to a certain extent the plate portions 43 combine to give considerable grouser action. Our flange-lugged auxiliary shoes, as here shown, may be used interchangeably on the right and left tracks.

Features of this invention were set forth in our prior application Serial No. 280,990 filed June 24, 1939, which was abandoned after the filing of the present application.

In Fig. 9 we have shown a modified form of auxiliary shoe. This shoe carries a second flange lug 42a spaced outwardly from the flange lug 42 to lie along the outer face of the rail and leave a normal clearance of about a half inch on either side of the rail. The rail head is thus received in the channel between the two flange lugs.

These channel-type shoes may be employed on both the right and left tracks, but they may economically be used on only one track. In the latter case, the climbing off action is essentially similar to that described, but the width of the channel, rather than the gauge of the right and left track lugs, confines the tractor to travel on the rails and limits the initial angular relation of tracks to rails preliminary to climbing off.

This channel-type shoe has the objection that the outer lug 42a may not so easily pass frogs and crossings without derailing the tractor. This may be remedied somewhat by not making the outer lug 42a so deep as the inner lug 42, so that the latter will still overlie the inner face of the rail head even when the lug 42a rides up to the level of the rail top.

When the channel-type shoe of Fig. 9 is used on both tracks, there is also the objection that the derailment may not be reliably accomplished at whatever point the driver may choose. This is because, in turning off to the right for example, if a lug 42a on the left track does not happen to be in exact "step" with, and directly opposite, a lug 42 on the right track when the latter lug reaches a position comparable with the lug B of Fig. 4, the leading lug 42a on the bottom reach of the left track may, by engaging the outer face of the left rail, withhold the front ends of the fixedly spaced tracks from shifting to the right enough to permit the lug 42 of position B to realize the slight overhang on the top of the right rail. It may require some serious delay and further distance of travel before there is a proper coincidence of relationship, as between critical leading shoes of the two tracks, to effect the climbing off action.

While we have illustrated and described these specific embodiments of our invention, we contemplate that many changes and substitutions may be used without departing from the scope and spirit of our invention.

We claim:

1. A caterpillar tractor, auxiliary shoes removably secured to the treadway of the tractor, each shoe consisting of a flat plate having an intermediate portion to engage the top of a rail, and a depending lug extending from one end of the intermediate portion to engage the side of a rail head, and means to secure the plate to the treadway of the tractor, the depending lugs being spaced apart, as viewed in the rail top engaging reach of the track, to define derailing gaps therebetween.

2. Interpivoted track shoes for adapting a track-type vehicle to run on the rails of a standard railway, the shoes presenting rail-top engaging bottom tread surfaces and carrying flange lugs depending below the tread surfaces, which lugs present generally vertical lateral right- and left-facing guide surfaces to lie normally in clearance adjacency to rail head right and left (respectively) lateral faces and to bear thereagainst from time to time normally to confine the tractor to the rails without need of steering the tractor; the lugs being disposed in two spaced parallel longitudinal rows and the lugs being constructed and arranged to leave inter-lug gaps; each gap (a) opening both downwardly and toward the adjacent rail head face, (b) extending upwardly a considerable distance above the lower edge of the leading adjoining guide surface, (c) extending a substantial distance back from the leading adjoining guide surface in a direction away from the associated rail head, and (d), together with the adjoining leading guide surface and its lower edge, defining a corner at the leading end of the gap adapted slightly to overhang, and gain a purchase upon, the top of the adjacent rail head when simultaneously (1), under steering effort upon the vehicle, the two lines of lugs are thrown into their maximum angular relationship to the rail as permitted by their normal confinement by the lugs, (2) also under the steering effort, the leading lug of the bottom reach of track is forcefully crowded transversely against the said adjacent rail head, and (3) the gap occurs between said leading lug of the bottom reach and the next forward lug descending from the leading track arc—whereby the vehicle may at will be derailed by causing a forceful turning effort of the vehicle.

3. The combination with a track-type tractor having right and left parallel tracks with interpivoted track shoes, in which the tractor is steered by drivingly urging one track ahead of the other—of means carried by the shoes for adapting the tractor to run on the rails of a standard railway but to be derailable at the will of the driver, said means comprising rail-top engaging bottom treads on at least some of the shoes and flange lugs carried by at least some of the shoes and depending below the level of the treads, which lugs present generally vertical lateral right- and left-facing guide surfaces to lie normally in clearance adjacency to rail head right and left (respectively) lateral faces and to bear thereagainst from time to time normally to confine the tractor to the rails without need of steering the tractor; the lugs being disposed in two spaced parallel longitudinal rows and the lugs being constructed and arranged to leave inter-lug gaps; each gap (a) opening both downwardly and toward the adjacent rail head face, (b) extending upwardly a considerable distance above the lower edge of the leading adjoining guide surface, (c) extending a substantial distance back from the leading adjoining guide surface in a direction away from the associated rail head, and (d), together with the adjoining leading guide surface and its lower edge, defining a corner at the leading end of the gap adapted slightly to overhang, and gain a purchase upon, the top of the adjacent rail head when simultaneously (1), under steering effort of the tractor, the two lines of lugs are thrown into their maximum angular relationship to the rail as permitted by their normal confinement by the lugs, (2) also under the steering effort, the leading lug of the bottom reach of track is forcefully crowded transversely against the said adjacent rail head, and (3) the gap occurs between said leading lug of the bottom reach and the next forward lug descending from the leading track arc.

4. The method of derailing to the right a track-type tractor traveling on rails of a railway and normally confined thereto by inter-gapped flange lugs arranged in two spaced parallel lines on interpivoted track shoes of the tractor, which consists in swinging the tracks into the maximum clockwise angle to the rails which their confinement by the lugs will permit, and then, while continuing to drive the tractor, simultaneously (a) holding the tracks in said angular relationship to the rails, (b) subjecting a right-facing side of a leading lug of the bottom reach of a track to a strong lateral thrust rightward against an adjacent left-facing side of a rail head, and (c) partially receiving the left top edge of said last-mentioned rail head into the gap between said lug of the leading bottom reach and the next lug forwardly thereof descending from the forward arc of the track, engaging the last mentioned lug substantially upon the top of the rail head to gain and retain a slight transversely overlapping purchase on the top, thereby lifting the leading end of the associated track to the level of the top of the rail head, and thereafter driving the lifted track across the top of the rail.

5. A pair of right and left tracks for a track-type tractor, the tracks having interpivoted shoes adapting the tractor to run on the rails of a standard railway, the shoes of the respective tracks presenting bottom tread surfaces for engaging the tops of the respective rails and carrying flange lugs depending below the tread surfaces to lie along the inside head faces of the respective rails and normally in clearance adjacency thereto comparable with the wheel flanges of railway cars to bear against the inner head faces from time to time normally to confine the tractor to the rails without need of steering the tractor; the lugs of each track being constructed and arranged to leave gaps longitudinally between them; each gap (a) opening both downwardly and toward the adjacent rail head face, (b) extending upwardly a considerable distance above the lower edge of the leading adjoining guide surface, (c) extending a substantial distance inwardly from the leading adjoining guide surface (that is, in a direction away from the associated rail head), and (d), together with the adjoining leading guide surface and its lower edge, defining a corner of the leading edge of the gap adapted slightly to overhang, and gain a purchase upon, the top of the adjacent rail head when simultaneously (1), under steering effort of the tractor, the two lines of lugs are thrown into their maximum angular relationship to the rail as permitted by their normal confinement by the lugs, (2) also under the steering effort, the leading lug of the bottom reach of the associated track is forcefully crowded transversely against the adjacent rail head, and (3) the gap occurs between said leading lug of the bottom reach and the next forward lug descending from the leading track arc—whereby the driver may at will derail the tractor by drivingly urging one track ahead of the other to cause a forceful turning effort of the tractor.

6. A track for one side of a track-type vehicle, the track having interpivoted track shoes adapting the vehicle to run on the rails of a standard railway with said track on one rail and a companion track at the other side of the vehicle on the other rail, said shoes presenting bottom tread surfaces for engaging the top surface of the associated rail head and carrying flange lugs depending below the tread surfaces on the left and right sides of the line of tread surfaces, whereby to form a downwardly opening channelway for receiving with considerable lateral clearance the head of the associated rail, with the right and left lugs presenting opposed guide surfaces to bear against the respective sides of the rail head from time to time normally to confine the vehicle to the rails without need of steering the vehicle, the right and left lugs respectively being disposed in two parallel longitudinal rows and the lugs being constructed and arranged to leave inter-lug gaps; each gap (a) opening both downwardly and toward the near face of the rail head, (b) extending upwardly a considerable distance above the lower edge of the leading adjoining guide surface, (c) extending a substantial distance back from the leading adjoining guide surface in a direction away from the near face of the rail head, and (d), together with the adjoining leading guide surface and its lower edge, defining a corner at the leading end of the gap adapted slightly to overhang, and gain a purchase upon, the top of the rail head when simultaneously (1), under steering effort upon the vehicle, the two lines of lugs are thrown into their maximum angular relationship to the associated rail as permitted by their normal confinement by the lugs, (2) also under the steering effort, the leading lug of the bottom reach of said track is forcefully crowded transversely against the near face of the rail head, and (3) the gap occurs between said leading lug at the bottom reach and the next forward lug in its line descending from the leading track arc—whereby the vehicle may at will be derailed by a forceful turning effort upon the vehicle.

7. A set of right and left tracks for a track-type vehicle adapted to run on the rails of a standard railway, wherein one track, and only one track, is in accordance with claim 6 and the other track is without substantial confining lugs depending below the shoe surfaces riding on the associated rail.

8. A set of right and left tracks for a track-type vehicle adapted to run on the rails of a standard railway, in which both tracks are in accordance with claim 6.

9. The combination with a crawler tractor having right and left parallel tracks for supporting and driving the tractor and having provision for steering the tractor by differentially driving the tracks, each track comprising an endless chain of shoes trained over longitudinally spaced wheels and having tread surfaces for contacting the tops of the rail heads of a railway track—of means for confining the tractor to the rails when normally running thereon and for enabling the tractor, at the will of the driver, to be maneuvered off the rails, said means comprising a longitudinally aligned series of flange lugs carried by each track and projecting below said tread surfaces at the inner sides of the associated rail head in a relation thereto similar to that of car wheel flanges, and presenting outwardly facing lateral guide surfaces adapted from time to time to contact the inner face of the associated rail head to effect the confinement, the lugs being constructed and arranged to define downwardly and outwardly opening gaps for their guide faces which extend a substantial distance inwardly from the guide surfaces and a substantial distance upwardly from the lower edges of the guide surfaces to form salient corners respectively adapted, when descending from the front arc of the track to the plane of the rail top at a time when the tracks are disposed at the maximum angle to the rails which the confinement by the lugs will permit and at a time when steering effort of the tractor applied to the other track maintains a transverse outward crowd upon the corner, to gain a slight outward overlap upon the near edge of the associated rail head whereby further descent of the corner and its lug about the front arc and into the bottom reach of track will lift the leading edge of that track up to the top of the rail head to permit other lugs of that track subsequently to run on top of the rail head.

10. The combination according to claim 9, wherein the lugs are carried by the shoes and the gaps come between the shoes.

11. The combination according to claim 9, wherein the shoes therein mentioned are primary shoes and wherein the tread surfaces and the flange lugs are carried by auxiliary shoes which are detachably secured to the primary shoes.

12. The combination according to claim 9, wherein the flange lugs are removably carried by the shoes.

13. A track according to claim 6, wherein the inner flange lugs depend a substantial distance lower than do the outer lugs.

14. A shoe assembly for the pivotal interconnection in a set of like assemblies to constitute the endless track of a track-type vehicle adapted to run on the rails of a railway and to be derailed by forceful steering effort upon the vehicle, the assembly comprising a shoe to extend transversely of the track, pintle bearings at each side of the assembly to interconnect it with adjoining assemblies, a downwardly presented tread surface adapted to engage the top of a rail head, and a flange lug extending crosswise of the shoe and depending therefrom to extend below the tread surface and to occupy a position at the inner side of the rail head comparable with the position of a car wheel flange and having clearance dimensions comparable therewith, the length of the flange lug crosswise of the shoe (that is, longitudinally of the rail) being less than the center-to-center spacing of the pintle bearings by a distance which is substantially less than the width of a rail head on which the track is to run but which is greater than one-fourth of the distance between the center-to-center spacing of the pintle bearings.

15. A shoe assembly for the pivotal interconnection in a set of like assemblies to constitute the endless track of a track-type tractor adapted to run on the rails of a railway and to be derailed by forceful steering effort of the tractor, the assembly comprising a shoe to extend transversely of the track, pintle bearings at each side of the assembly to interconnect it with adjoining assemblies, a downwardly presented tread surface adapted to engage the top of a rail head, and a flange lug extending crosswise of the shoe and depending therefrom to extend below the tread surface and to occupy a position at the inner side of the rail head comparable with the position of a car wheel flange and having clearance dimensions comparable therewith, and presenting a side face for guiding contact with the near face of the rail head, the guide face being considerably shorter than the center-to-center spacing of the pintle bearings to leave gaps between the guide face of the lug and the guide faces of adjoining lugs, the length of the guide faces being less than three-fourths of the center-to-center spacing of the pintle bearings.

16. Left and right tracks for a track-type vehicle having shoes with bottom tread surfaces to engage the tops of the respective rails of a railway and flange lugs carried by the shoes and depending below the tread surfaces to lie along the inner sides of the rail heads, in the relation of car wheel flanges, normally to confine the vehicle to running on the rails, the length of the lugs, along the tracks, being less than the spacing of the shoes to leave gaps between the ends of adjoining lugs which are too short to receive the rail heads when the vehicle passes over them crosswise, but which are nevertheless greater than one-fourth of the spacing of the shoes, for the purpose described.

17. Tracks for a track-type tractor adapted to operate optionally on or off the rails of a railway, the tracks presenting bottom tread surfaces for engaging the tops of the rail heads, and track-carried flange lugs to depend below the tops of the rails beside right and left rail head faces for confining the tracks normally to the rails without steering by lateral guide faces of the flange lugs engaging the adjacent rail head faces from time to time, the guide faces, longitudinally of the tractor, being interrupted at intervals by gaps which open downwardly and toward the adjacent rail faces, which gaps extend far enough above the lower edges of the guide faces and far enough back therefrom and are of sufficient longitudinal dimension, to enable the tractor, in the manner described, to climb out of its confinement to the rails upon a forceful steering effort of the tractor at the will of the operator.

18. A vehicle having a pair of laterally spaced tracks adapting it to run optionally on either the ground or on the rails of a railway, the vehicle being constructed and arranged to permit some substantial lateral turning of the tracks relative to the rails when the vehicle is running on the rails, means for driving the tracks to progress the vehicle and for differentially driving the tracks to steer the vehicle, and depending structure carried by the tracks presenting surfaces to oppose the associated rail head laterally thereof normally to confine the tracks to the rails when running therealong and presenting other surfaces, normally disposed upwardly of the bottom of the depending structure and inwardly of the vertical plane of the inside face of the rail heads and hence normally out of line of engagement with the associated rail head, for engaging the associated rail head from above, when the track is subjected to a willful steering effort which thrusts the leading end of the track laterally against the associated rail head, to lift the track onto the rail head for derailing the tracks.

19. In the art of driving along and upon the rails of railways a vehicle having tracks differentially driven whereby to steer the vehicle and track-carried depending flanges for normally maintaining the tracks upon the rails—the method of derailing the vehicle which consists in differentially driving the tracks and thereby urging one of the tracks into forceful lateral engagement with its associated rail and at a slight angular relationship thereto, engaging one of the flanges of the track upon the top of the associated rail, and lifting the one track, by said flange, to bring successive flanges of the track on to the top of the rail for travel thereacross.

20. An endless track for a crawler type vehicle adapting it to run selectively upon open terrain or upon railroad rails, including, in combination, a series of pivotally connected shoe assemblies comprising treads and flange lugs projecting from said treads having lateral faces arranged to oppose the adjacent lateral surface of an associated rail along the bottom run of the track normally to maintain the tractor upon the rail without active steering, said flange lugs having, at railwardly opening gaps between the rail-opposing faces, shoulders which, as the lugs enter the lower reach of the track from one end thereof, are presented downwardly and toward the opposite end of the track and are so constructed and arranged that when the foremost shoe of the bottom run of the track is subjected to a definite lateral outward thrust by a forceful turning effort upon the track, to crowd the lateral face of the foremost flange lug against the opposing surface of the associated rail head, the shoulder of the lug of the shoe which forwardly adjoins the foremost shoe of the bottom run of the track will descend about the forward curve of the track into overlapping contact with the longitudinal top edge of the associated rail to climb thereonto, with said edge received in one of the gaps and to lead the successively descending lugs of the track to engage the top of the rail, for derailing the track.

21. In combination, a pair of laterally spaced tracks carried by and supporting a vehicle and adapting it to run optionally on either the ground or on the rails of a railway, the vehicle being constructed and arranged to permit some lateral turning of the tracks relative to the rails when the vehicle is running on the rails, means for progressing the tracks along the rails, structure carried by the tracks presenting surfaces laterally to oppose associated rail heads normally to confine the tracks to the rails when running therealong, and means for wilfully exerting, upon the leading end of a track, a lateral thrust against the associated rail head, said structure presenting surfaces normally disposed upwardly of the bottom of said structure and inwardly of the vertical plane of the inside faces of the rail heads and hence in normally non-overlapping relation to the rail head but positioned to engage the associated rail head from above when the track is turned into angular relation to the rail heads by said lateral thrust, whereby to climb the track onto the rail head for derailing the track.

22. A track shoe for a track-type tractor, comprising an elongated plate adapted to be secured transversely across one of the track linkages of the tractor, a flange lug structure extending from the wear surface of the plate to function similarly as a car wheel flange and cooperate with other similar lug structures on companion shoes for confining the tractor to run upon railway rails, and grouser structures adjacent the opposite ends of the plate and on opposite sides of the flange lug structure operable to assist in running the tractor on open terrain when off the rails, the grouser structure on the rail-opposing side of the flange lug structure being spaced from such side to accommodate the width of a rail head on which the shoe travels.

23. A track shoe according to claim 22 in which the plate has a wear surface portion of increased thickness, in the area between the rail-opposing side of the flange lug structure and the grouser structure on that side, adapted for flatwise engagement of the top surface of the rail head.

24. A track shoe according to claim 22 wherein the grouser structures include means for shielding heads of bolts securing the shoe in place.

MURRAY E. BURNS.
GEORGE M. BONNELL.